United States Patent
Apokatanidis et al.

(10) Patent No.: US 11,150,774 B2
(45) Date of Patent: Oct. 19, 2021

(54) MODIFYING DISPLAY OF OBJECTS ON A USER INTERFACE FOR A COMPUTING DEVICE BASED ON DETECTED PATTERNS OF USER INTERACTION

(71) Applicant: International Business Machines Corporation, Armonk, NY (US)

(72) Inventors: Dimitri Apokatanidis, Saint-Lambert (CA); Jeffrey P. Brown, Strathroy (CA); Emmanuel Barajas Gonzalez, Guadalajara (MX); Shaun E. Harrington, Sahuarita, AZ (US)

(73) Assignee: International Business Machines Corporation, Armonk, NY (US)

( * ) Notice: Subject to any disclaimer, the term of this patent is extended or adjusted under 35 U.S.C. 154(b) by 496 days.

(21) Appl. No.: 14/865,587

(22) Filed: Sep. 25, 2015

(65) Prior Publication Data

US 2017/0090679 A1    Mar. 30, 2017

(51) Int. Cl.
   *G06F 3/0481*      (2013.01)
   *G06F 9/451*       (2018.01)

(52) U.S. Cl.
   CPC ............ *G06F 3/0481* (2013.01); *G06F 9/453* (2018.02)

(58) Field of Classification Search
   None
   See application file for complete search history.

(56) References Cited

U.S. PATENT DOCUMENTS

| | | | | |
|---|---|---|---|---|
| 8,296,728 B1* | 10/2012 | Webster | ............. | G06F 3/04886 717/109 |
| 8,434,023 B2* | 4/2013 | Ge | ......................... | G06F 3/0482 715/811 |
| 8,595,647 B2* | 11/2013 | Sabin | ..................... | G06F 3/0481 715/811 |
| 8,930,840 B1* | 1/2015 | Risko | ..................... | G06F 3/0481 |
| 9,046,917 B2* | 6/2015 | Senanayake | .............. | G06F 3/01 |
| 2007/0050711 A1* | 3/2007 | Walker | .................. | G06F 16/986 715/205 |
| 2007/0079237 A1* | 4/2007 | Abrams | .................. | G06F 9/451 715/700 |
| 2007/0118803 A1* | 5/2007 | Walker | .................. | G06F 16/954 715/744 |
| 2008/0036743 A1* | 2/2008 | Westerman | ............. | G06F 3/038 345/173 |

(Continued)

FOREIGN PATENT DOCUMENTS

GB       2347318 A     8/2000

*Primary Examiner* — Arpan P. Savla
*Assistant Examiner* — Haimei Jiang
(74) *Attorney, Agent, or Firm* — Kunzler Bean & Adamson

(57) ABSTRACT

A computer program product for adapting user interfaces includes code that monitors a plurality of user interactions with one or more resources within a user interface of an electronic device or software application, analyzes the plurality of user interactions to determine and store one or more usage patterns, determines whether a user interaction with a resource accessible within the user interface corresponds to a stored usage pattern, and adapts the user interface in response to determining that the user interaction corresponds to a stored usage pattern, where adapting the user interface includes displaying the resource within the user interface with the corresponding physical aspect of the resource in the stored usage pattern.

25 Claims, 8 Drawing Sheets

(56) References Cited

U.S. PATENT DOCUMENTS

| | | | |
|---|---|---|---|
| 2009/0279115 A1* | 11/2009 | Martin | G06F 3/1257 358/1.13 |
| 2009/0293017 A1 | 11/2009 | Carter et al. | |
| 2010/0199195 A1* | 8/2010 | Carounanidy | G06F 16/9577 715/760 |
| 2011/0138328 A1* | 6/2011 | Ge | G06F 3/0482 715/811 |
| 2013/0212487 A1* | 8/2013 | Cote | G06F 9/451 715/745 |
| 2013/0311411 A1* | 11/2013 | Senanayake | G06F 16/3349 706/13 |
| 2013/0332523 A1* | 12/2013 | Luu | G06Q 30/0269 709/204 |
| 2014/0053189 A1* | 2/2014 | Lee | H04N 21/4751 725/37 |
| 2014/0195972 A1 | 7/2014 | Lee et al. | |
| 2014/0201681 A1* | 7/2014 | Mahaffey | H04M 1/72454 715/846 |
| 2016/0246373 A1* | 8/2016 | Sakaguchi | G06F 3/016 |

* cited by examiner

600

| | 8:00 PM | 8:30 PM | 9:00 PM |
|---|---|---|---|
| 4 ABC | SUNDAY NIGHT FOOTBALL | | 4 NEWS |
| 2 CBS | THE GOOD WIFE | | 2 NEWS |
| HBO | GAME OF THRONES | | MOVIE |
| 7 KUED | PBS MASTERPIECE | | News Hour |
| 9 KUEN | Joy of Painting | Beauty of Painting | TV411 |
| 11 KBYU | Curious George | Partridge Fam. | NewsHour |
| 13 KSTU | Fox 13NEWS | Fox 13 News | The Simpsons |

FIG. 6

MODIFYING DISPLAY OF OBJECTS ON A USER INTERFACE FOR A COMPUTING DEVICE BASED ON DETECTED PATTERNS OF USER INTERACTION

FIELD

The subject matter disclosed herein relates to assisting users of electronic devices and more particularly relates to improving user productivity when using an electronic device.

BACKGROUND

The number of tasks that can be performed by a user with an electronic device through software applications has proliferated. A user's efficiency in performing tasks with software applications on an electronic device is affected by the user interface of both the electronic device and the software application. An adaptive user interface increases user efficiency and productivity when using an electronic device or software application.

BRIEF SUMMARY

A computer program product for adapting user interfaces is disclosed, the computer program including a usage tracking module, a usage pattern recognition module, a usage prediction module, and an adaptation module. The usage tracking module monitors a plurality of user interactions with one or more resources within a user interface of an electronic device or software application. The usage pattern recognition module analyzes the plurality of user interactions to determine and store one or more usage patterns. The usage prediction module determines whether a user interaction with a resource accessible within the user interface corresponds to a stored usage pattern. The adaptation module adapts the user interface in response to determining that the user interaction corresponds to a stored usage pattern, where adapting the user interface includes displaying the resource within the user interface with the corresponding physical aspect of the resource in the stored usage pattern.

A method for adapting user interfaces is disclosed. The method monitors a plurality of user interactions with one or more resources within a user interface of an electronic device or software application, analyzes the plurality of user interactions to determine and store one or more usage patterns, determines whether a user interaction with a resource accessible within the user interface corresponds to a stored usage pattern, and adapts the user interface in response to determining that the user interaction corresponds to a stored usage pattern, where adapting the user interface includes displaying the resource within the user interface with the corresponding physical aspect of the resource in the stored usage pattern.

Another computer program product for adapting user interfaces is disclosed, the computer program including a usage tracking module, a usage pattern recognition module, a usage prediction module, and an adaptation module. The usage tracking module monitors a plurality of user interactions with one or more resources within a user interface of an electronic device or software application. The usage pattern recognition module analyzes the plurality of user interactions to determine and store one or more usage patterns. The usage prediction module determines a task of a user based upon a user interaction with a resource within the user interface. The adaptation module adapts the user interface in response to determining the task of the user, where adapting the user interface includes modifying the user interface to facilitate the user in accomplishing the task.

Another method for adapting user interfaces is disclosed. The method monitors a plurality of user interactions with one or more resources within a user interface of an electronic device or software application, analyzes the plurality of user interactions to determine and store one or more usage patterns, determines a task of a user based upon a user interaction with a resource within the user interface, and adapts the user interface in response to determining the task of the user, where adapting the user interface includes modifying the user interface to facilitate the user in accomplishing the task.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 6 is another illustration to explain how a user interface adaptor in accordance with the present invention adapts the user interface of a software application;

DETAILED DESCRIPTION

Figure 1A:
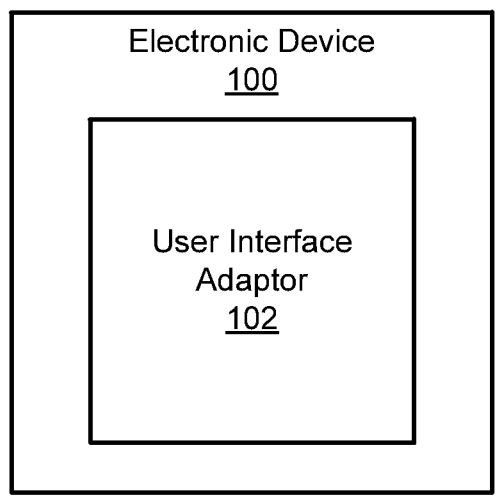
FIG. 1A is a schematic block diagram illustrating one embodiment of an electronic device containing an apparatus for adapting the user interface of the electronic device in accordance with the present invention.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program instructions may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

The description of elements in each figure may refer to elements of proceeding figures. Like numbers refer to like elements in all figures, including alternate embodiments of like elements.

FIG. 1A is a schematic block diagram illustrating one embodiment of an electronic device 100 containing an apparatus 102 for adapting the user interface of the electronic device 100. The electronic device 100 may be any computer or other electronic device, such as a laptop or desktop computer, a tablet, a smartphone, a television, a server, set top media player, video game console, etc. The user interface adaptor 102, described further below, resides on the electronic device 100.

Figure 1B:
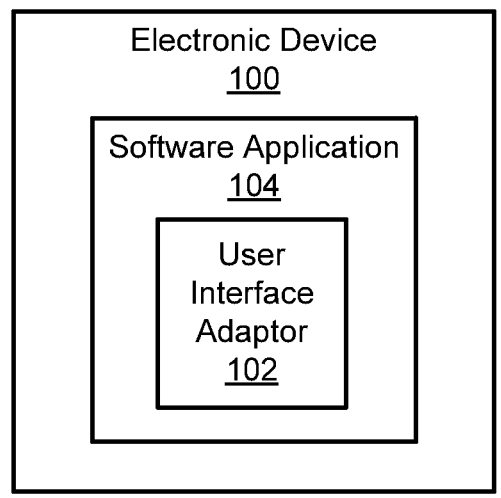
FIG. 1B is a schematic block diagram illustrating one embodiment of an electronic device containing an apparatus for adapting the user interface of a software application stored on the electronic device in accordance with the present invention.

FIG. 1B is a schematic block diagram illustrating one embodiment of an electronic device 100 containing an apparatus 102 for adapting the user interface of a software application 104 stored on the electronic device 100. The software application 104 includes any software program, process, or code running on the electronic device 100, including an operating system of the electronic device. In one embodiment, the user interface adaptor 102, described further below, resides within the software application 104. In another embodiment, the user interface adaptor 102 resides partially within the software application 104 and partially alone on the electronic device 100.

Figure 2:
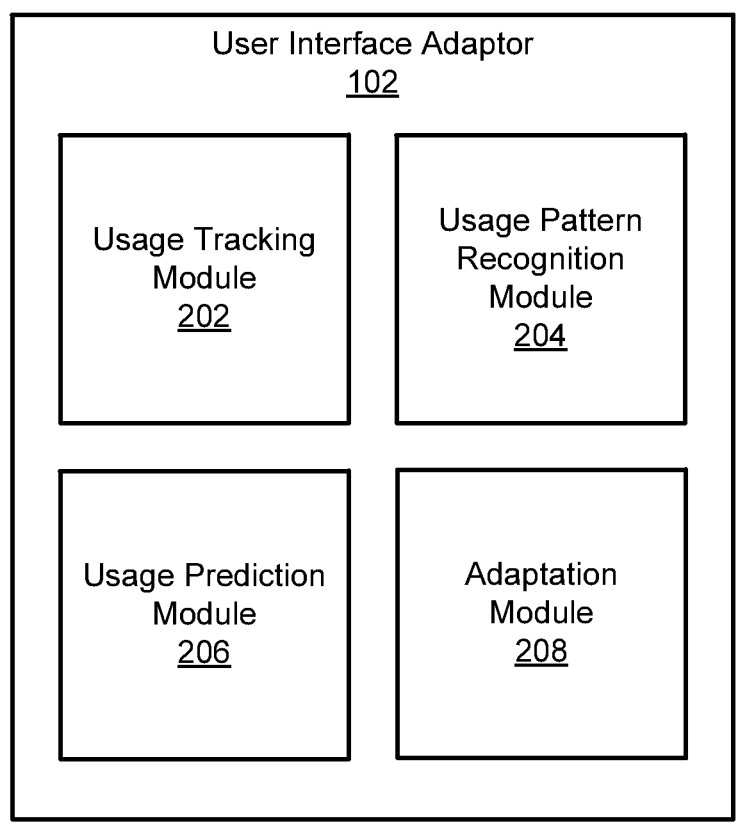
FIG. 2 is a schematic block diagram illustrating one embodiment of a user interface adaptor in accordance with the present invention.

FIG. 2 is a schematic block diagram illustrating one embodiment of an apparatus 200 in accordance with the present invention. The apparatus 200 includes one embodiment of a user interface adaptor 102 having a usage tracking module 202, a usage pattern recognition module 204, a usage prediction module 206, and an adaptation module 208, which are described below.

The usage tracking module 202 monitors user interactions with the electronic device 100 or software applications 104 running on the electronic device 100. In an embodiment, the usage tracking module 202 monitors user interactions by monitoring resources accessible on the electronic device 100 or through the software application 104 by a user through a user interface. A resource can include files, data streams, web sites, directories, networks, databases, servers, programs, or user interface elements (e.g., window, icon, toolbar, buttons, cursor, mouse pointer, command line). User interactions with resources within a user interface of the an electronic device 100 or software application 104 can take various forms, including but not limited to mouse clicks, touch input, voice input, and keyboard input (e.g., selecting a document/application/folder via mouse click, typing commands on a command line, drag and drop with a touch gesture).

The usage tracking module 202 monitors several aspects of each resource. In one embodiment, the usage tracking module 202 monitors a resource's physical size and position within the user interface of the electronic device 100 or software application 104. The physical size of a resource within a user interface of the electronic device 100 or software application 104 refers to either the actual or relative size of the resource as presented on a display of the electronic device 100 or within the software application 104. For example, the usage tracking module 202 may record the height and width of an open document or file directory window. As another example, the usage tracking module 202 may note the size of an open document or application relative to the size of the electronic device 100 display (e.g., full desktop, half desktop, 35%). The position of a resource within the user interface of the electronic device 100 or software application 104 refers to coordinates of the visual representation of the resource in the graphical user interface. For example, the position of a file may be indicated by the computer desktop coordinates of an icon representing the file. In an embodiment where the graphical user interface spans multiple displays, the position of a resource may also refer to a specific display of the multiple displays and its coordinates within that display. Another example of a resource's position is the location of a cursor or mouse pointer within a software application window. In one embodiment, the usage tracking module 202 monitors a resource's physical size and position within the user interface of the electronic device 100 or software application 104 over time. For example, the usage tracking module 202 may track the location of a toolbar within a software application 104 and note when the user moves the toolbar from its default position within the user interface of the software application 104.

Another aspect of a resource that the usage tracking module 202 monitors is a resource's activity over time. A state of activity indicates whether a resource is active/inactive, open/closed, modified, or an object of focus to the user (e.g., currently selected, viewed, and/or being used). In an embodiment, the usage tracking module 202 monitors when a resource is active or inactive. For example, the usage tracking module 202 can note when (e.g., date, time, day of the week) when a user starts a specific program, when the program is shut down, how long the program was active, and how frequently the user started the program. In another embodiment, the usage tracking module 202 monitors when a resource is open or closed. For example, the usage tracking module 202 can note when a user opened a document, when the user closed the document, how long the document was open, and how often the user opens the document. In a specific embodiment, the usage tracking module 202 monitors when a resource is modified. Modification can refer to substantive modifications to the content of a resource (e.g., adding or deleting data from a spreadsheet) or the properties of a resource (e.g., renaming a file, changing a document's location in the file system). For example, the usage tracking module 202 can note when (e.g., date, time, day of week) a document was last modified and how often it has been modified over a certain period of time. In a single embodiment, the usage tracking module 202 monitors when a resource is an object of focus to the user. A resource is an object of focus when it is currently being selected, viewed, or active in the foreground of the graphical user interface. For example, if a user has multiple programs active and/or documents open simultaneously, the program or document in the foreground on the display will be the object of focus for the user.

The usage pattern recognition module 204 analyzes data collected by the usage tracking module 202 with respect to resources to detect a usage pattern of one or more resources by a user. In one embodiment, the usage pattern recognition module 204 analyzes the positions of one or more resources within the user interface of an electronic device 100 or software application 104 to detect a usage pattern. For example, the usage pattern module 204 may detect that a user tends to place an application window for a specific program in a certain location on the computer desktop, or on a secondary display in a multiple display setup (e.g., an email program is always stationed on a second monitor). As another example, the usage pattern module 204 may detect that the mouse pointer tends to move within a certain area of the computer desktop. The usage pattern module 204 can also detect that a user prefers to minimize or close the window of an active program (e.g., antivirus program).

In an embodiment, the usage pattern recognition module 204 analyzes the relative positions of multiple resources within the user interface of the electronic device 100 or software application to detect a usage pattern. For example, the usage pattern module 204 may detect that when a user is playing a computer game or watching a streaming video while listening to music or monitoring an online auction in a web browser, he or she prefers the windows for each application be positioned in certain locations on the computer desktop relative to each other. As another example, the usage pattern module 204 may detect that when a user has multiple browser tabs open in a browser window, he or she prefers to have tabs marking certain websites next to each other and/or in a particular sequence (e.g., all browsing tabs related to a particular topic—such as social media, news, or sports—clustered together). A further example is when the usage pattern module 204 may detect that when a user navigates through the file system, he or she prefers to view all the files in a particular folder sorted by a particular criterion (e.g., alphabetical, creation date). In another example, the usage pattern recognition module 204 may also detect that when a user who opens multiple file directory windows may orient and/or size the windows such that they do not overlap with each other.

In another embodiment, the usage pattern recognition module 204 analyzes the physical sizes of resources within the user interface of the electronic device 100 or software application 104 to detect a usage pattern. For example, the usage pattern recognition module 204 may detect that a user likes to have certain applications maximized on a computer desktop (e.g., computer games, web browsers) while limiting other applications to a smaller size (e.g., media players).

In a certain embodiment, the usage pattern recognition module 204 analyzes the state of activity for a resource over time to detect a usage pattern. For example, the usage pattern recognition module 204 may detect that multiple programs are typically active at the same time and infer that a user uses these programs in conjunction with each other. As another example, the usage pattern recognition module 204 may detect that a user often accesses a particular resource at a certain time of day, weekday, or month (e.g., web email at 9 am each day, bank website on first day of the month, television show on same channel each Sunday night at 8 pm, news program each night at 11 pm, social media application every morning).

In one embodiment, the usage pattern recognition module 204 analyzes user input with respect to a resource within the user interface of the electronic device 100 or software application 104 to determine a usage pattern. For example, the usage pattern recognition module 204 may detect a user typing certain commands more frequently into a command line interface and keep a list of the most commonly typed commands over a period of time as a usage pattern. For example, the usage pattern recognition module 204 may detect forty-five (45) total keyboard commands entered at a command line interface, with twenty-eight (28) of the forty-five keyboard commands being distinct, and storing the five distinct or unique keyboard commands that have been entered the most times. The usage pattern recognition module 204 may also store the most common sequence or combination of typed commands over a period of time as a usage pattern.

In a certain embodiment, the usage pattern recognition module 204 stores the usage patterns it detects for future reference. Usage patterns may be indexed by each distinct or unique resource, and a usage pattern may pertain to multiple distinct resources. The usage pattern recognition module 204 may delete or modify the stored usage patterns based on continued analysis of additional data collected by the usage tracking module 202. For example, a usage pattern pertaining to a resource that has been deleted from the electronic device 100 may be discarded. In one instance, the usage pattern recognition module 204 may give more weight to more recently collected data when analyzing the data for usage patterns and may change stored usage patterns based on more recently collected data. For example, if the usage tracking module 202 observes that the size or position of a resource (e.g., file folder window, application window) has changed, the usage pattern recognition module 204 can modify the corresponding usage pattern with the new physical dimensions and location of the resource. The stored usage patterns are referenced by the usage prediction module 206 and adaptation module 208, as described below.

The usage prediction module 206 determines whether a user interaction with a resource within the user interface of the electronic device 100 or the software application 104 corresponds to a stored usage pattern. In one embodiment, the usage prediction module 206 determines whether a plurality of user interactions with one or more resources within the user interface of the electronic device 100 or the software application 104 corresponds to a stored usage pattern. In an embodiment, the usage prediction module 206 determines whether a user interaction corresponds a stored usage pattern by checking an index of stored usage patterns for the resource associated with the user interaction. As an example, the usage prediction module 206 may detect that a user has activated the channel guide application on a television or set top box, notes the day of the week and time, and finds a usage pattern (e.g., the user's viewing preference) for the same day and near the same time. In another embodiment, the usage prediction module 206 determines whether a plurality of user interactions corresponds to a stored usage pattern by checking an index of stored usage patterns for usage patterns indexed to the one or more resources associated with the plurality of user actions. When determining whether a plurality of user interactions corresponds to a usage pattern, the plurality of user interactions may be either a number of the most recent user interactions (e.g., the ten most recent user interactions) or the most recent user interactions within a predetermined period of time, along with the time of the user interactions (e.g., time of day, day of week, date). For example, the usage prediction module 206 may detect that a user has double clicked on two document icons (or application icons) in near succession, notes the time of day and/or date, and find one or more usage patterns involving both documents (or programs).

In an embodiment, the usage prediction module 206 determines a task that the user is attempting to accomplish based on the user interaction with the resource. For example, the usage prediction module 206 may infer that a user is attempting to open a document or application when it detects the user double clicking on the document or application icon. As another example, the usage prediction module 206 may infer that a user is attempting to find a document, application, or other resource when it detects the user opening a file system directory window.

The adaptation module 208 modifies the user interface of the electronic device 100 or software application 104 in response to the usage prediction module 206 determining that a user interaction corresponds to a stored usage pattern. In one embodiment, the adaptation module 208 modifies the user interface of the electronic device 100 or software application 104 to display the one or more resources that a user is interacting within the user interface with their corresponding physical aspect as recorded in the usage pattern. If there are multiple usage patterns stored for a resource, in one embodiment, the adaptation module modifies the user interface to display the one or more resources that a user is interacting with to the corresponding physical aspect as recorded in the most recently stored usage pattern. For example, when a user starts a certain program on an electronic device 100, the adaptation module 208 may display the program at its most recent location within the user interface for the electronic device 100, with the program window set to the same physical dimensions as stored in a usage pattern. As another example, when a user opens a second program while the first program is still open, the adaptation module 208 may automatically move the first program to a different location within the user interface while placing the program in another location in accordance with an observed usage pattern. Thus, sometimes displaying a resource according to its physical aspect as recorded in a usage pattern requires changing the physical aspect of an existing resource within the user interface.

In another embodiment, the adaptation module 208 modifies the user interface of the electronic device 100 or software application 104 to facilitate the performance of a task by a user in response to the usage prediction module 206 determining the task that the user is trying to perform. For example, if the adaptation module 208 detects that a user is interacting with a command line interface (i.e., typing a command), it can display a list of the most frequently used commands. Alternatively, the adaptation module 208 can, from the first few letters typed by the user on the command line, find a matching command from the list of most frequently used commands and fill in the rest of the command. As another example, if the adaptation module 208 detects at a command line that the user is typing the first command in a stored sequence of commands, it may then fill in on the command line the next command in the sequence of commands.

In an embodiment, the adaptation module 208 waits until a user switches his or her focus from one resource to another before adapting the user interface of the electronic device 100 or software application 104 in order to prevent unwanted interference or intrusion. In another embodiment, the adaptation module 208 waits until a pause in user interaction with the electronic device 100 or software application 104 before modifying the user interface. In a specific embodiment, the adaptation module 208 allows a user to reject the modifications to the user interface within a specified period of time. For example, the adaptation module 208 may present the user interface modifications with a dialog box allowing the user to rejects the changes. Alternatively, the user may be able to reject user interface changes within a certain period of time using a certain touch gesture or other input. FIGS. 3-7 provide some examples of how the adaptation module 208 modifies the user interface of the electronic device 100 or software application 104.

Figure 3:
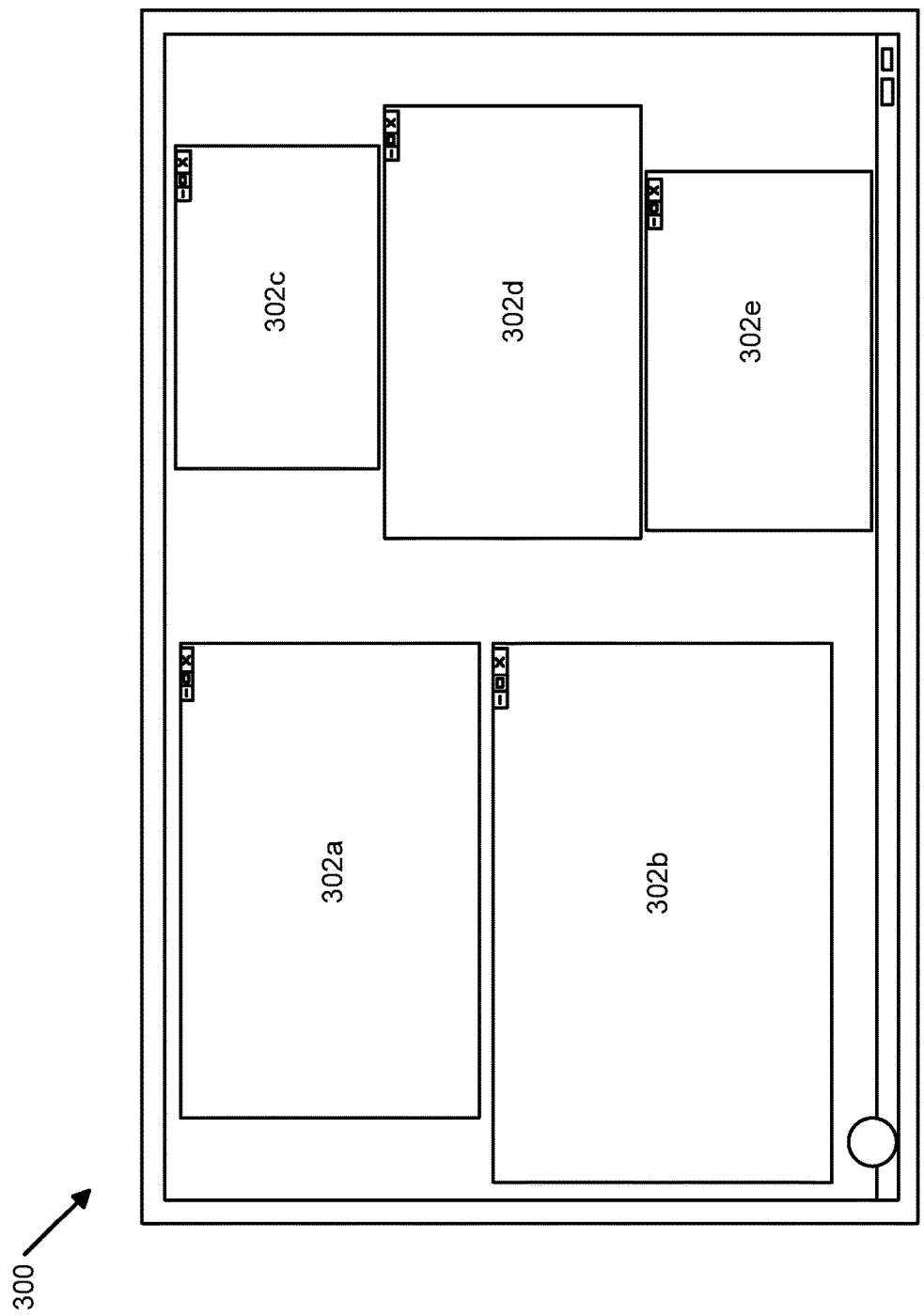
FIG. 3 is an illustration to explain how a user interface adaptor in accordance with the present invention adapts the user interface of an electronic device.

FIG. 3 is an illustration to explain how a user interface adaptor 102 in accordance with the present invention adapts the user interface of an electronic device 100. FIG. 3 shows a computer desktop 300 with multiple application windows 302, where each application window 302 is a resource. The usage tracking module 202 monitors the physical and temporal aspects of each application window, including their dimensions and positions within the desktop 300. The usage pattern recognition 204 module detects that two or more of the application windows 302 remained open during the same time and stores this usage pattern. Thus, the next time a user opens two or more of these applications, the usage prediction module 206 may determine that there is a usage pattern relating to the user's interaction with the computer. In response, when the user opens each application, the adaptation module 208 will automatically position the application at the user's preferred position.

Figure 4:
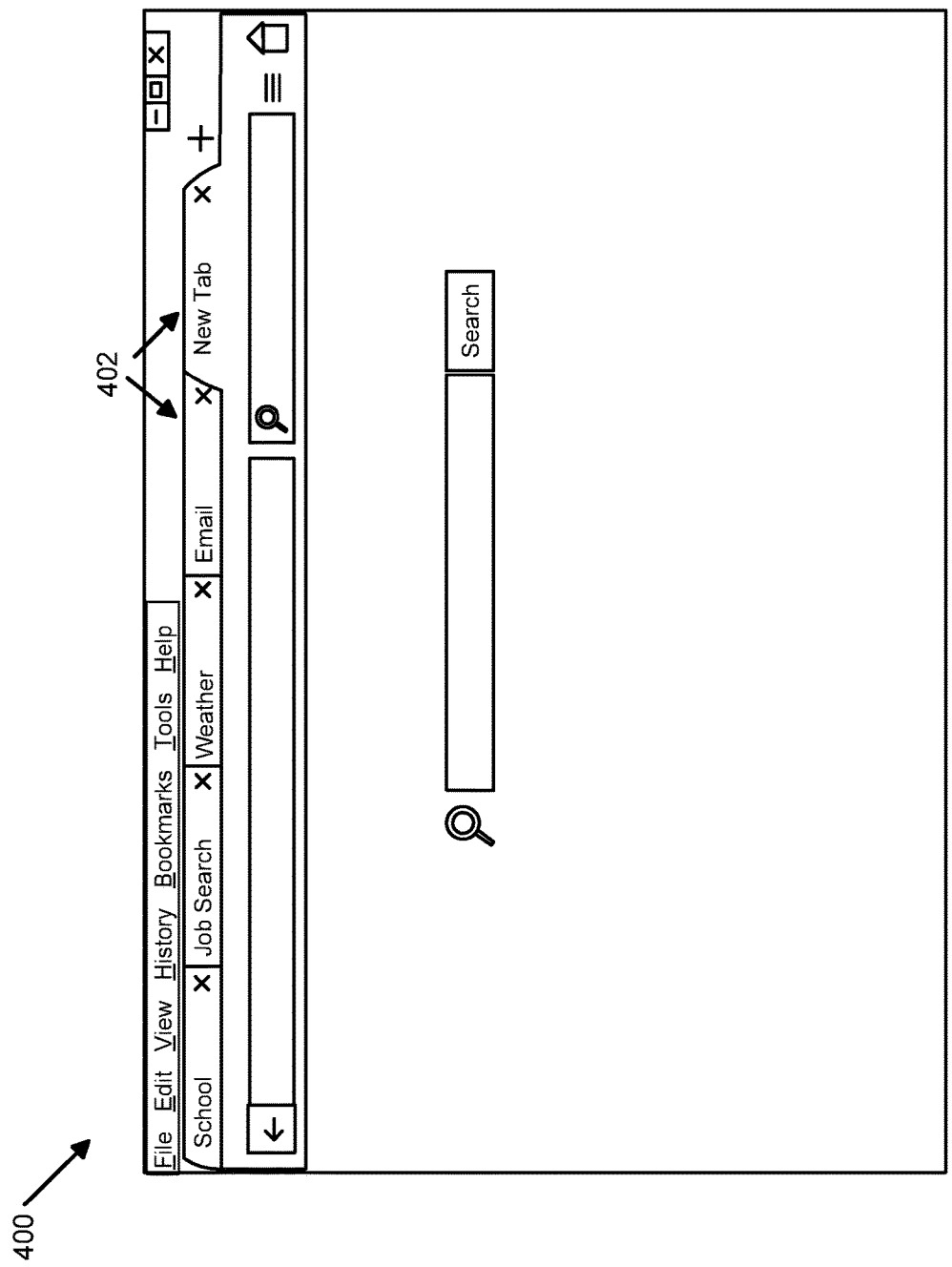
FIG. 4 is an illustration to explain how a user interface adaptor in accordance with the present invention adapts the user interface of a software application.

FIG. 4 is an illustration to explain how a user interface adaptor 102 in accordance with the present invention adapts the user interface of a software application 104. FIG. 4 shows a web browser window with multiple tabs 400, where each tab represents an accessible resource (e.g., website). The usage tracking module 202 monitors the position of each tab 402 in the browser window and notes if the user changes the order of the tabs 402. The usage tracking module 202 may also monitor how long a user focuses and interacts with each tab 402, the order in which a user visits each tab 402, and when the user interacted with each tab 402. The usage pattern recognition module 204 detects that the user will interact with some tabs 402 more frequently than others, in a certain sequence, and/or at a specific time. Thus, the next time a user opens a browser with multiple tabs and accesses websites found in the usage pattern, the usage prediction module 206 may determine that there is a usage pattern. In response, when the user pauses in his or her interaction with the tabs 402 (such as focusing on a different application or opening a new tab), the adaptor module 208 will adjust the positions of the tabs 402 in accordance with a certain usage pattern. For example, the adaptor module 208 may group the tabs 402 by how often each website was visited or the order in which websites were visited.

Figure 5:
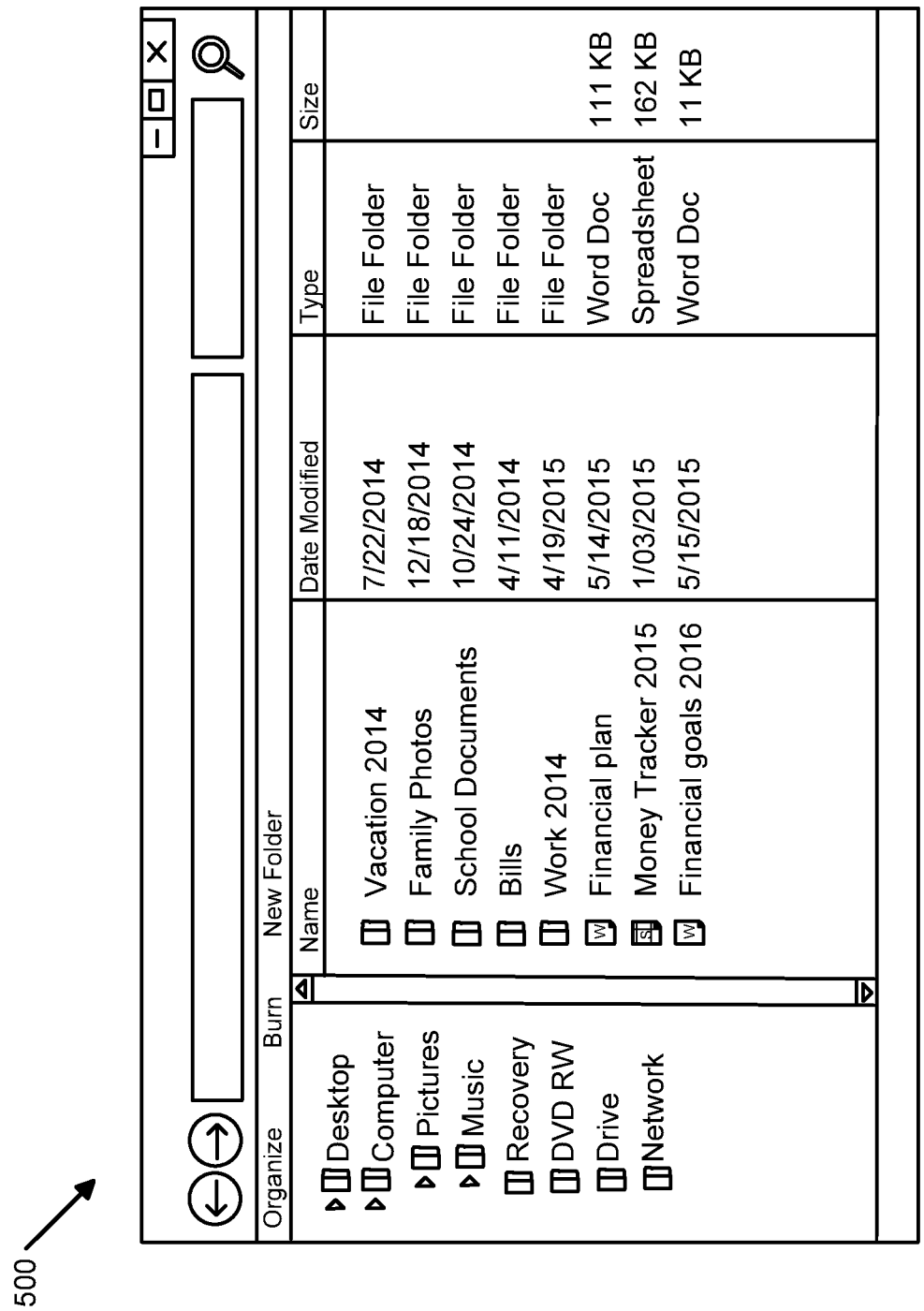
FIG. 5 is another illustration to explain how a user interface adaptor in accordance with the present invention adapts the user interface of an electronic device.

FIG. 5 is another illustration to explain how a user interface adaptor 102 in accordance with the present invention adapts the user interface of an electronic device 100. FIG. 5 shows a file system explorer window 500 listing a set of resources (i.e., files and directories). As explained above, the usage tracking module 202 tracks user interactions with each resource and notes when each resource was accessed, and the usage pattern recognition module 204 may detect that these file and directories are the most commonly accessed resources, either within the past 24 hours or at a particular time of day, and store these usage patterns. Thus, when a user opens a file system explorer window 500, the usage prediction module 206 may determine that the user is attempting to access a certain resource. In response, the adaptor module 208 facilitates this task by listing the resources (e.g., files, directories) in the usage patterns of the most recently and/or frequently accessed resources. In addition, the adaptation module 208 can also sort the listed resources according to the preference of the user as detected by the usage pattern recognition module 204.

FIG. 6 is another illustration to explain how a user interface adaptor 102 in accordance with the present invention adapts the user interface of a software application 104. FIG. 6 shows a television 600 displaying a cable channel guide listing a plurality of channels, where the signal for each channel is a resource. As explained above, the usage tracking module 202 tracks which channels a user watches at a particular time and the usage pattern recognition module 204 detects viewing patterns of what shows (or types of shows) the user likes to watch, and when the user likes to watch these shows. These viewing habits form a usage pattern. Thus, when a user opens the cable channel guide, the usage prediction module 206 will determine that the user wishes to watch a television show. In response, the adaptor module 208 will facilitate this task by listing the channels that the user is most likely interested in given his or her previous viewing habits. Adapting the channel guide in this fashion saves a viewer from having to scroll through potentially hundreds of channels just to find a television show he or she wants to watch, saving the viewer valuable time and effort.

The foregoing examples are only illustrative of the resources that can be monitored by the usage tracking module 202, the usage patterns that may be detected by the usage pattern recognition module 204, and the user interface modifications created by the adaptation module 208, and not meant to be limiting in any way.

Figure 7:
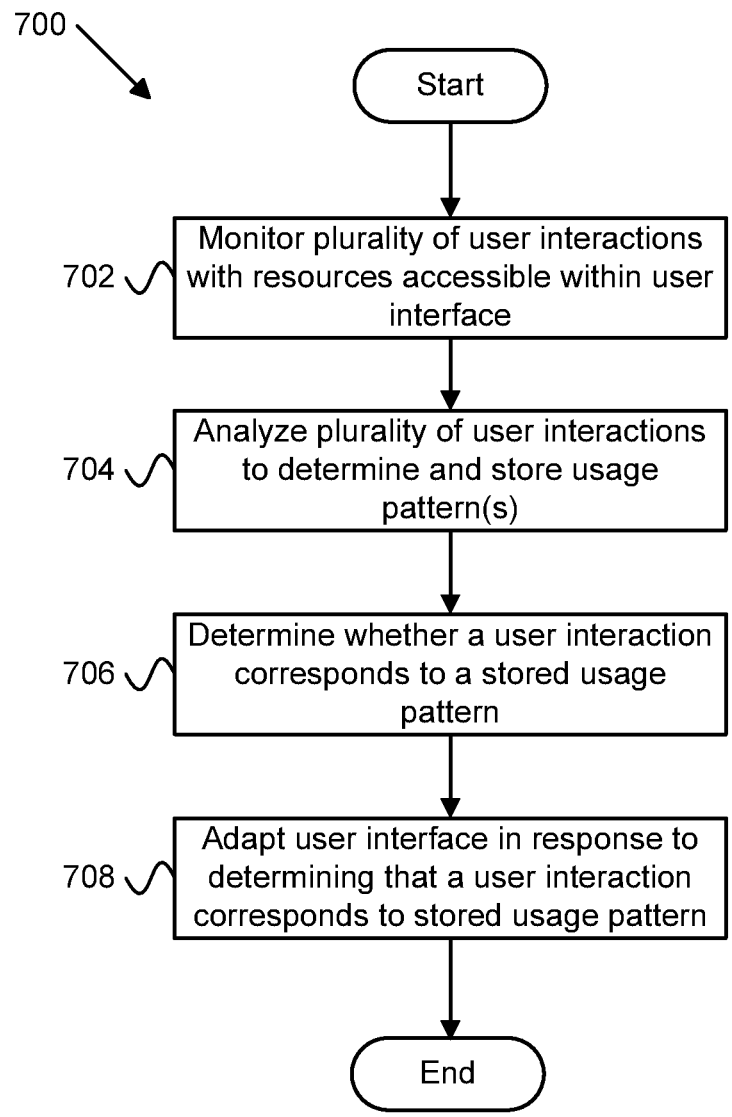
FIG. 7 is a schematic flow chart diagram illustrating one embodiment of a method for adapting a user interface of an electronic device in accordance with the present invention.

FIG. 7 is a schematic flow chart diagram illustrating one embodiment of a method 700 for adapting a user interface of an electronic device 100 or software application 104 in accordance with the present invention. The method 700 starts and monitors 702 a plurality of user interactions with resources accessible within a user interface of an electronic device 100 or software application 104. The method 700 analyzes 704 the plurality of user interactions to determine and store one or more usage patterns. The method 700 determines 706 whether a user interaction with a resource accessible within the user interface corresponds to a stored usage pattern. The method 700 adapts 708 the user interface in response to determining that the user interaction corresponds to a stored usage pattern, where adapting the user interface comprises displaying the resource within the user interface with the corresponding physical aspect of the resource in the stored usage pattern, and the method 700 ends.

Figure 8:
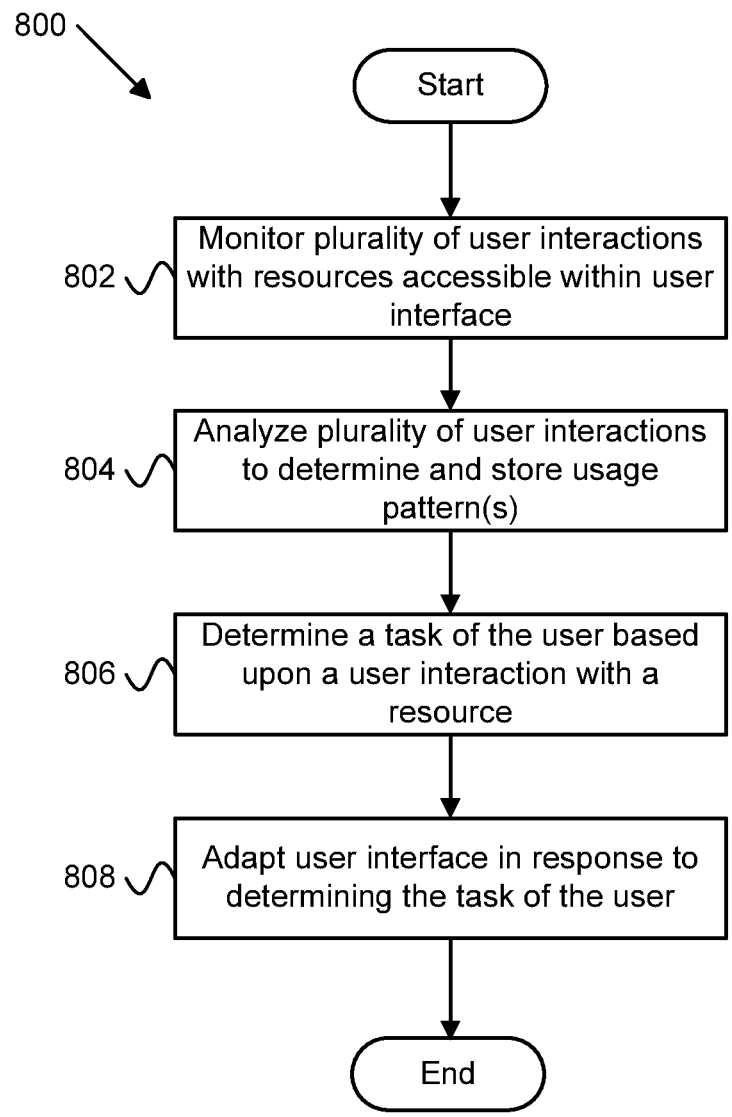
FIG. 8 is a schematic flow chart diagram illustrating another embodiment of a method for adapting a user interface of an electronic device 100 or software application 104 in accordance with the present invention.

FIG. 8 is a schematic flow chart diagram illustrating another embodiment of a method 800 for adapting a user interface of an electronic device 100 or software application 104 in accordance with the present invention. The method 800 starts and monitors 802 a plurality of user interactions with resources accessible within a user interface of an electronic device 100 or software application 104. The method 800 analyzes 804 the plurality of user interactions to determine and store one or more usage patterns. The method 800 determines 806 a task of the user based upon a user interaction with a resource accessible within the user interface. The method 800 adapts 808 the user interface in response to determining the task of the user, where adapting the user interface comprises modifying the user interface to facilitate the user in accomplishing the task, and the method 800 ends.

What is claimed is:

1. A computer program product for adapting a user interface, the computer program product comprising a computer readable storage medium having program instructions embodied therewith, the program instructions readable/executable by a processor to cause the processor to:
   monitor a plurality of user interactions with a first application of a plurality of applications, by a user, accessible via a user interface, the first application forming at least a portion of a content currently being displayed on a display device;
   analyze the plurality of user interactions with the first application;
   determine a usage pattern of the first application for the user based on the analyzed plurality of user interactions;
   generate, for the user, a set of user preferences for the first application based on the determined usage pattern of the first application, the set of user preferences including displaying the first application with a first physical aspect at a preferred position on the display device that the user utilized most often during the plurality of user interactions defining the determined usage pattern;
   receive, from the user, a set of first current user inputs to the first application at a first current time, the set of first current user inputs defining a first user interaction with the first application;
   compare the set of first current user inputs and the determined usage pattern of the first application to determine a match;
   predict that the user is performing the determined usage pattern of the first application in response to at least a portion of the set of first current user inputs matching the determined usage pattern of the first application;
   wait for a first trigger event in response to predicting that the user is performing the determined usage pattern of the first application, the first trigger event including a set of second current user inputs to the first application at a second current time defining a second user interaction with the first application occurring subsequent to the set of first current user inputs defining the first user interaction with the first application; and
   in response to detecting the first trigger event:
      modify display of the content currently being displayed on the display device by:

displaying, in real time, the first application with the first physical aspect at the preferred position in accordance with the set of user preferences for the first application, and modifying, in real time, display of a second physical aspect of a second application being displayed within the user interface, provide the user a predetermined amount of time to reject the modification of the content currently being displayed on the display device, in response to the user rejecting the modification within the predetermined amount of time, replace the modified display with the previous content currently being displayed on the display device, and in response to the user not rejecting the modification of the content currently being displayed on the display device within the predetermined amount of time:

maintain the display of the first application with the first physical aspect at the preferred position in accordance with the set of user preferences for the first application, and maintain the modified display of the second physical aspect of the second application being displayed within the user interface, wherein:

displaying the first application with the first physical aspect modifies the second physical aspect of the second application relative to the first physical aspect, and modifying the display of the second physical aspect of the second application being displayed within the user interface further includes moving the second application from the preferred position to a new position in response to the second application being positioned at the preferred position at the first current time when the set of first current user inputs defining the first user interaction with the first application is received.

2. The computer program product of claim 1, wherein:
monitoring the plurality of user interactions with the first application comprises monitoring a physical dimension and a position of the first application within the user interface; and displaying the first application with the first physical aspect modifies the second physical aspect of the second application relative to the first physical aspect comprises modifying a displayed second size of the second application relative to a displayed first size of the first application.

3. The computer program product of claim 2, wherein monitoring the plurality of user interactions with the first application further comprises monitoring an activity of the first application over time.

4. The computer program product of claim 1, wherein:
analyzing the plurality of user interactions with the first application further comprises analyzing the monitored activity of the first application over the time; and the program instructions further cause the processor to modify the set of user preferences for the first application based on the analyzed activity of the first application over the time.

5. The computer program product of claim 1, wherein analyzing the detected plurality of user interactions with the first application comprises:

analyzing user inputs over a period of time with respect to the plurality of applications; and determining a quantity of distinct user inputs to the first application that have been detected multiple times over the period of time.

6. The computer program product of claim 5, wherein determining the quantity of distinct user inputs to the first application comprises determining a quantity of distinct sequences of user inputs that have been detected the most number of times over the period of time.

7. The computer program product of claim 1, wherein:
comparing the set of first current user inputs and the determined usage pattern of the first application to determine a match comprises checking an index of stored usage patterns for the first application, the index of stored usage patterns comprising the detected plurality of user interactions; and predicting that the user is performing the determined usage pattern of the first application comprises the at least the portion of the set of first current user inputs matching one or more user interactions in the detected plurality of user interactions defining the determined usage pattern of the first application included in the index of stored usage patterns for the first application.

8. A method comprising:
monitoring a plurality of user interactions with a first application of a plurality of applications, by a user, accessible via a user interface, the first application forming at least a portion of a content currently being displayed on a display device;

analyzing the plurality of user interactions with the first application;

determining a usage pattern of the first application for the user based on the analyzed plurality of user interactions;

generating, for the user, a set of user preferences for the first application based on the determined usage pattern of the first application, the set of user preferences including displaying the first application with a first physical aspect at a preferred position on the display device that the user utilized most often during the plurality of user interactions defining the determined usage pattern;

receiving, from the user, a set of first current user inputs the first application at a current time, the set of first current user inputs defining a first user interaction with the first application;

comparing the set of first current user inputs and the determined usage pattern of the first application to determine a match;

predicting that the user is performing the determined usage pattern of the first application in response to at least a portion of the set of first current user inputs matching the determined usage pattern of the first application;

waiting for a first trigger event in response to predicting that the user is performing the determined usage pattern of the first application, the first trigger event including a set of second current user inputs to the first application at a second current time defining a second user interaction with the first application occurring subsequent to the set of first current user inputs defining the first user interaction with the first application; and in response to detecting the first trigger event:
modifying display of the content currently being displayed on the display device by:

displaying, in real time, the first application with the first physical aspect at the preferred position in accordance with the set of user preferences for the first application, and modifying, in real time, display of a second physical aspect of a second application being displayed within the user interface, providing the user a predetermined amount of time to reject the modification of the content currently being displayed on the display device, in response to the user rejecting the modification within the predetermined amount of time, replacing the modified display with the previous content currently being displayed on the display device, and in response to the user not rejecting the modification of the content currently being displayed on the display device within the predetermined amount of time:

maintaining the display of the first application with the first physical aspect at the preferred position in accordance with the set of user preferences for the first application, and maintaining the modified display of the second physical aspect of the second application within the user interface, wherein:

displaying the first application with the first physical aspect modifies the second physical aspect of the second application relative to the first physical aspect, and modifying the display of the second physical aspect of the second application being displayed within the user interface further includes moving the second application from the preferred position to a new position in response to the second application being positioned at the preferred position at the first current time when the set of first current user inputs defining the first user interaction with the first application is received.

9. The method of claim 8, wherein monitoring the plurality of user interactions with the first application comprises monitoring a physical dimension and a position of the first application within the user interface.

10. The method of claim 8, wherein monitoring the plurality of user interactions with the first application further comprises monitoring an activity of the first application over time.

11. The method of claim 8, wherein:

analyzing the plurality of user interactions with the first application further comprises analyzing the monitored activity of the first application over the time; and the method further comprises modifying the set of user preferences for the first application based on the analyzed activity of the first application over the time.

12. The method of claim 8, wherein analyzing the detected plurality of user interactions with the first application comprises:

analyzing user inputs over a period of time with respect to the plurality of applications; and determining a quantity of distinct user inputs to the first application that have been detected multiple times over the period of time.

13. The method of claim 12, wherein determining the quantity of distinct user inputs to the first application comprises determining a quantity of distinct sequences of user inputs that have been detected the most number of times over the period of time.

14. The method of claim 8, wherein:

comparing the set of first current user inputs and the determined usage pattern of the first application to determine a match comprises checking an index of stored usage patterns for the first application, the index of stored usage patterns comprising the detected plurality of user interactions; and predicting that the user is performing the determined usage pattern of the first application comprises the at least the portion of the set of first current user inputs matching one or more user interactions in the detected plurality of user interactions defining the determined usage pattern of the first application included in the index of stored usage patterns for the first application.

15. The computer program product of claim 1, wherein the program instructions further cause the processor to:

receive, from the user, a third interaction with the first application;

predict that the user is performing a second usage pattern of the first application based on the third interaction with the first application;

wait for a second trigger event in response to predicting that the user is performing the second usage pattern of the first application, the second trigger event including a fourth user interaction with the first application occurring subsequent to the third user interaction with the first application; and in response to detecting the second trigger event:

display, in real time, the first application with a third physical aspect in accordance with a different one or more user preferences for the first application, and modify display of the first application within the user interface in real time to include the third physical aspect, wherein displaying the first application with the third physical aspect modifies the first physical aspect of the first application relative to the third physical aspect.

16. The computer program product of claim 15, wherein modifying display of the first application to include the third physical aspect comprises replacing the first physical aspect with the third physical aspect in response to detecting the second trigger event.

17. The method of claim 8, further comprising:

receiving, from the user, a third interaction with the first application;

predicting that the user is performing a second usage pattern of the first application based on the third interaction with the first application;

waiting for a second trigger event in response to predicting that the user is performing the second usage pattern of the first application, the second trigger event including a fourth user interaction with the first application occurring subsequent to the third user interaction with the first application; and in response to detecting the second trigger event:

displaying, in real time, the first application with a third physical aspect in accordance with a different one or more user preferences, and modifying display of the first application within the user interface in real time to include the third physical aspect, wherein displaying the first application with the third physical aspect modifies the first physical aspect of the first application relative to the third physical aspect.

18. The method of claim 17, wherein modifying display of the first application to include the third physical aspect comprises replacing the first physical aspect with the third physical aspect in response to detecting the second trigger event.

19. The computer program product of claim 1, wherein:
the second user interaction with the first application comprises one of:
the user switching focus from the first application to a second application of the plurality of applications, and
the user pausing interaction with the first application; and
detecting the first trigger event comprises detecting a corresponding one of:
the user switching focus from the first application to the second application, and
the user pausing interaction with the first application.

20. An apparatus, comprising:
a usage tracking module that monitors a plurality of user interactions with a first application of a plurality of applications, by a user, accessible via a user interface, the first application forming at least a portion of a content currently being displayed on a display device;
a usage pattern recognition module that:
analyzes the plurality of user interactions with the first application,
determines a usage pattern of the first application for the user based on the analyzed plurality of user interactions, and
generates, for the user, a set of user preferences for the first application based on the determined usage pattern of the first application, the set of user preferences including displaying the first application with a first physical aspect at a preferred position on the display device that the user utilized most often during the plurality of user interactions defining the determined usage pattern;
a usage prediction module that:
receives, from the user, a set of first current user inputs to the first application at a current time, the set of first current user inputs defining a first user interaction with the first application,
compares the set of first current user inputs and the determined usage pattern of the first application to determine a match, and
predicts that the user is performing the determined usage pattern of the first application in response to at least a portion of the set of first current user inputs matching the determined usage pattern of the first application; and
an adaptation module that:
waits for a first trigger event in response to predicting that the user is performing the determined usage pattern of the first application, the first trigger event including a set of second current user inputs to the first application at a second current time defining a second user interaction with the first application occurring subsequent to the set of first current user inputs defining the first user interaction with the first application, and
in response to detecting the first trigger event:
modifies display of the content currently being displayed on the display device by:
displaying, in real time, the first application with the first physical aspect at the preferred position in accordance with the set of user preferences for the first application, and
modifying, in real time, display of a second physical aspect of a second application being displayed within the user interface,
provides the user a predetermined amount of time to reject the modification of the content currently being displayed on the display device,
in response to the user rejecting the modification within the predetermined amount of time, replaces the modified display with the previous content currently being displayed on the display device, and
in response to the user not rejecting the modification of the content currently being displayed on the display device within the predetermined amount of time:
maintains the display of the first application with the first physical aspect in accordance with the set of user preferences for the first application, and
maintains the modified display of the second physical aspect of the second application within the user interface,
wherein:
displaying the first application with the first physical aspect modifies the second physical aspect of the second application relative to the first physical aspect,
modifying the display of the second physical aspect of the second application being displayed within the user interface further includes moving the second application from the preferred position to a new position in response to the second application being positioned at the preferred position at the first current time when the set of first current user inputs defining the first user interaction with the first application is received, and
at least a portion of each of said modules comprises one or more of a set of hardware circuits, a set of programmable hardware devices, and executable code stored on a set of non-transitory computer-readable storage media.

21. The apparatus of claim 20, wherein, in monitoring the plurality of user interactions with the first application, the usage tracking module is configured to:
monitor a physical dimension and a position of the first application within the user interface over time.

22. The apparatus of claim 20, wherein:
in analyzing the plurality of user interactions with the first application, the usage pattern recognition module is configured to analyze the monitored activity of the first application over the time; and
the adaptation module is further configured to modify the set of user preferences for the first application based on the analyzed activity of the first application over the time.

23. The apparatus of claim 20, wherein, in analyzing the detected plurality of user interactions with the first application, the usage pattern recognition module is configured to:
analyze user inputs over a period of time with respect to the plurality of applications; and
determine a quantity of distinct user inputs to the first application that have been detected multiple times over the period of time.

24. The apparatus of claim 20, wherein:
in comparing the set of first current user inputs and the determined usage pattern of the first application to determine a match, the usage prediction module is configured to check an index of stored usage patterns for the first application, the index of stored usage patterns comprising the detected plurality of user interactions; and in predicting that the user is performing the determined usage pattern of the first application, the usage prediction module is configured to determine that the at least the portion of the set of first current user inputs matches one or more user interactions in the detected plurality of user interactions defining the determined usage pattern of the first application included in the index of stored usage patterns for the first application.

25. The apparatus of claim 20, wherein:

the usage prediction module is further configured to:
   receive, from the user, a third interaction with the first application, and
   predict that the user is performing a second usage pattern of the first application based on the third interaction with the first application; and the adaptation module is further configured to:
   wait for a second trigger event in response to predicting that the user is performing the second usage pattern of the first application, the second trigger event including a fourth user interaction with the first application occurring subsequent to the third user interaction with the first application, and
   in response to detecting the second trigger event:
      display, in real time, the first application with a third physical aspect in accordance with a different one or more user preferences for the first application, and
      modify display of the first application within the user interface in real time to include the third physical aspect,
   wherein displaying the first application with the third physical aspect modifies the first physical aspect of the first application relative to the third physical aspect.

\* \* \* \* \*